United States Patent Office 3,418,078
Patented Dec. 24, 1968

3,418,078
METHOD OF DETECTING FLAWS
Adolf Mlot-Fijalkowski, Elmwood Park, and Joseph A. Strosnik, Hillside, Ill., assignors to Magnaflux Corporation, Chicago, Ill., a corporation of Delaware
No Drawing. Filed June 8, 1964, Ser. No. 373,566
18 Claims. (Cl. 23—230)

ABSTRACT OF THE DISCLOSURE

A penetrant for the non-destructive testing for flaws in surfaces that come in contact with liquid oxygen, the penetrant consisting essentially of a non-flammable, relatively non-volatile, polymer of chloro-trifluoroethylene. The penetrant may be in the form of a liquid for spraying or brushing onto surface undergoing test or may be in the form of an aerosol, and may contain a color or dye, or be colorless where a dye or penetrant is contained in the developer. A volatile chlorinated hydrocarbon, as a coupler, and a solvent for the dye, such as a non-flammable chlorinated diphenyl can be used with the polymer of chloro-trifluoroethylene.

---

This invention relates to a method of detecting flaws and other surface discontinuities, and more particularly to a penetrant method for the non-destructive testing of materials the surfaces of which are subsequently to be in contact with liquid oxygen.

While the penetrant method of non-destructive testing has been in use for at least a couple of decades, new problems have arisen in connection with the penetrant method for the non-destructive testing of surfaces that are to be used in confining liquid oxygen, such as the surfaces of missiles, rockets and parts thereof. Liquid penetrants heretofore used have, in general, included as components, flammable organic compounds or reactive inorganic compounds, which tend to react with liquid oxygen and to create a hazard because they are capable of exploding and/or igniting when subjected to mechanical shock or some other sudden energy surge while in contact with liquid oxygen. For these reasons, no currently available penetrant systems are known of which the chemical components or residues of such components are fully compatible with liquid oxygen, and which at the same time give satisfactory performance.

It is therefore an important object of this invention to provide a method of detecting flaws by means of a liquid penetrant that is non-reactive to liquid oxygen to such an extent that practically no hazard is involved where the method is applied to surfaces that are subsequently to be in contact with liquid oxygen.

It is a further important object of this invention to provide a method for the non-destructive testing of surfaces that are subsequently to be in contact with liquid oxygen, in which method a liquid penetrant and a powdered developer are used that are both relatively inert and insensitive to liquid oxygen and that therefore give rise to no hazard from that source, yet are capable in combination of giving a positive indication of the presence of a crack, flaw or other surface discontinuity in the material, structure or part undergoing test.

Other and further important objects of this invention will become apparent from the following description and the appended claims.

The usual penetrant method of non-destructive testing comprises the steps of applying a liquid penetrant to the surface of the material, or test body, removing the excess penetrant from the surface of the body being tested while leaving penetrant retained in the flaws, if any, for subsequent exudation therefrom, and applying thereover a developer powder capable of absorbing or of being wetted by the liquid penetrant and therefore of facilitating the exudation of the penetrant from the cracks, or flaws, to thereby give an indication of the presence of such discontinuities.

It is usually customary in a method such as broadly described to employ a contrastingly colored penetrant, which may suitably be a fluorescent or a non-fluorescent dye that is soluble in the liquid penetrant, and to employ a developer, whether of the dry or of the wet type, that is adapted to enhance the contrasting visibility of the color of the penetrant when absorbed by the developer, or admixed therewith, whereby a clear and definite indication of the crack, flaw or other surface discontinuity is given when the test body at the completion of the indication-developing step, is observed under fluorescigenous or visible light, as the case may be.

While the method of our present invention involves the same general principles as just indicated, our invention further involves the selection of materials for use in the penetrant system that are inert toward liquid oxygen and yet perform satisfactorily in the detection of surface discontinuities.

The liquid penetrant that is preferably used in the method of our invention is a non-flammable, hydrogen-free, relatively non-volatile, normally liquid low molecular weight, polymer of chloro-trifluoroethylene $$(CF_2=CFCl)$$

Polymers of chloro-trifluoroethylene are available in the market under the proprietary name, "Kel-F" oils, a product of Minnesota Mining & Manufacturing Company, having the following characteristics:

POLYMERS OF CHLORO-TRIFLUOROETHYLENE

| "Kel-F" Oil No. | Odor | Mol. wt. | Spec. gr., 68° F. | Viscosity centistokes at— | | Ref. Ind. at 77° F. |
|---|---|---|---|---|---|---|
| | | | | 100° F. | 210° F. | |
| 1 | Sweet | 60 | 1.877 | 3.1 | 1.0 | 1.400 |
| 3 | Odorless | 630 | 1.932 | 25 | 3.0 | 1.405 |
| 10 | do | 780 | 1.966 | 250 | 10.0 | 1.410 |

The foregoing liquid polymers of chloro-trifluoroethylene are substantially colorless and relatively viscous, the viscosity being ordinarily between 1 and 300 centistokes at 100° F. Inasmuch as they have a relatively low degree of solubility toward dyes which are usually employed in coloring liquid penetrants, or developers, the aforesaid liquid polymers, when used in their normal, uncolored state, are employed in combination with a colored developer in a manner that will later on be explained herein.

The liquid penetrant may be applied to the surface to be tested by pouring, spraying (either as a finely divided spray or aerosol), brushing, or in any other suitable manner. Following the application of the liquid penetrant to the surface, and its penetration into any flow or other surface discontinuities, the liquid is removed from the surface in such a manner as to leave within the surface discontinuities any of the liquid penetrant that has penetrated thereinto. The removal of the superficial liquid penetrant is best accomplished by the use of a volatile, non-flammable, liquid solvent, as a cleaner, and for this purpose, chlorinated hydrocarbons that are non-flammable have been found satisfactory. Examples of suitable chlorinated hydrocarbons are, carbon tetrachloride, trichloroethane and trichloroethylene. The volatile liquid cleaner may be sprayed or poured on the surface to remove the liquid penetrant, with which the cleaner is miscible. Due to the volatility of the liquid cleaner and the time of contact permitted between the cleaner and the surface to which the liquid penetrant had been applied, spraying of the liquid cleaner is preferred, since then the rate of evaporation is such that substantially none of the liquid cleaner penetrates into the flows or other surface discontinuities. Consequently, the penetrant is removed from the surface but not from the flaws. Removal of the cleaner from the surface, together with such amounts of liquid penetrant as have been dissolved therein, is thus accomplished by evaporation or by evaporation and draining. Heat may be employed to assist in the evaporation of the cleaner solvent from the surface.

In the next step of our method, a developer is used to obtain a contrasting color indication of any flaws or defects. As the developer, it is preferable to use an inert free-flowing, adsorbent or absorbent, white powder. Any finely divided silica or silicate, alkaline earth carbonate, diatomaceous earth, talc, or the like may be used, but for some purposes it is preferred to use a silica aerogel, such as that marketed under the name "Santocel" by Monsanto Chemical Company. In its finely divided form, this silica aerogel has extremely low density and exhibits a very high oil-adsorptivity. It is a white, uniform, impalpable, free-flowing powder having a density of about 7.5 lbs. per cubic foot (centrifuged in toluol), a pH of 7.2, a purity of 99.5%, an oil absorption of 240 lbs. of oil per hundred pounds of silica, and a surface area of 290 sq. meters per gram. In its normal agglomerated form, it has a particle size that will be retained on a 60-mesh (U.S. standard) screen. Its ultimate particle size, however, is very much smaller, usually less than 10 microns.

The agglomerates of the silica aerogel have the ability to hold the much finer, dust-like particles of a pigment, dye or other color, in suspension, but readily release such finer particles of color to the exudate from the flaws or other discontinuities. While the dye or color may not be soluble in the liquid penetrant, itself, the dye is soluble in the mixture of penetrant and volatile cleaner solvent to an extent sufficient to wet or even dissolve the dye. In either case, the contrasting color of the dye with the whiteness of the developer may serve to give a very definite indication of the existence of the flaw or other surface discontinuity.

After the dry developer has been applied to the surface of the test body as a mobile, relatively evenly distributed layer over the surface, the loose particles are removed by a gentle air stream without disturbing the powder that adheres to the liquid penetrant in the surface defects. Inspection of the article treated as above described is then carried out either in ordinary or white light, if a visible dye has been used, or under ultraviolet, filtered ultraviolet (black light) or other exciting radiation, if a fluorescent color has been used. A minimum amount of time must, of course, be allowed for the liquid penetrant to soak thoroughly the adhering particles of dye in order to bring up to a maximum intensity the visible or fluorescent color that is provided by the dye.

In aerosol modifications of the above described method of our invention, either the penetrant or the developer, or both, may be in the form of aerosols. In the former case, a mixture of a solvent and a coupler is preferably used in the penetrant with the liquid polymer of chlorotrifluoroethylene in order to effect dissolution of the dye in the penetrant and the penetrant is combined with propellant, such as a Freon or mixture of Freons, and dispensed from a pressure container in the usual manner. A suitable formula for the liquid penetrant mixture for use in an aerosol is as follows:

| | Percent by weight |
|---|---|
| Liquid polymer of chloro-trifluoroethylene | 37 |
| Arochlor 1254 (solvent for dye) | 4 |
| Trichloroethylene (coupler) | 59 |

Arochlor 1254 is a non-flammable chlorinated diphenyl that is a yellow-tinted viscous liquid with no flash point. Other liquid chlorinated diphenyls also having no flash point can be used satisfactorily, but Arochlor 1254 is preferred.

Other relatively non-flammable couplers than trichloroethylene can be used, such as tetrachloroethylene (perchloroethylene), 1,1,1-trichloroethane and other chlorinated hydrocarbons.

Any suitable oil-soluble dye, whether fluorescent or non-fluorescent, may be incorporated in the above penetrant composition to give the depth of color desired. Suitable fluorescent dyes include Fluorol 7GA (naphthalimade fluorescent oil-soluble dyestuff sold by General Dyestuffs Corporation), fluorescent emerald green, and Brilliant Yellow E–503.

After the penetrant has been applied in the form of an aerosol, the excess of penetrant is removed by spraying the surface of the test piece with a chlorinated hydrocarbon that is extremely volatile and non-flammable.

After the removal of the excess of penetrant, a developer, also in the form of an aerosol, is applied to the test piece. The following is a suitable composition of an aerosol-type developer.

| | | |
|---|---|---|
| Trichloroethylene | gals | 110 |
| Albacar W–5960 | lbs | 100 |
| Cab-O-Sil M–5 | lbs | 10 |

In the application of the foregoing developer composition, the particles of the developer reach the surface of the test piece in substantially dry state, due to loss of volatile carrier in transit from the spray tip to the test piece. There, the particles adhere to the surface and soak up any penetrant liquid remaining in the surface flaws, or defects, to give the customary indication.

As previously indicated, in place of Albacar W–5960 (which is a precipitated calcium carbonate), or Cab-O-Sil M–5 (which is a finely divided silica) other finely divided, inert silicas, carbonates or silicates can be used. In general, the particle size should be in the range of from 0.2 to 10 microns.

Where the liquid penetrant is to be used without color added and the color is included in the dry developer, it is feasible to use inorganic pigments in admixture with the silicate aerogel, or other component of the developer. Non-fluorescent pigments include metallic oxides, cobalt blue and others, while as exemplary of a suitable fluorescent pigment, Saturn Yellow, zinc sulfide, or zinc-cadmium sulfide and others may be employed.

The following examples will serve to illustrate the preferred embodiments of our invention, but it should be understood that these are illustrative only and not intended to limit the scope of our invention.

EXAMPLE I

Non-fluorescent penetrant-visible dye developer

The penetrant used in this example had the following composition:

| | Parts by wt. |
|---|---|
| "Kel-F" oil | 60.4 |
| Arochlor #1254 | 7.1 |
| Trichloroethylene | 94.7 |

After spraying the penetrant on the test piece and removing any excess by spraying on to the surface a volatile chlorinated hydrocarbon, specifically, methylene chloride, a dry, non-fluorescent developer composition formulated as follows, is applied by spraying or dusting on the test piece:

Developer base: Parts by wt.
- Talc _____ 50
- Aluminum oxide _____ 20
- Calcium silicate _____ 40
- Silica aerogel _____ 50

In the final formulation of the developer to 14 parts of the developer base was added 1 part by weight of oil red OB, also in dry, finely powdered form.

The excess of developer was removed by a gentle stream of air, leaving developer powder only at the surface defects, where penetrant, admixed perhaps with some methylene chloride, remained in the flaw, or flaws. At that locus, or those loci, the residual penetrant, or penetrant mix caused the dye in contact therewith to be wetted and to give thereby an indication of the defect. No actual solution of the dye in the penetrant was required to give such indication, when inspected under visible, or white, light.

Instead of using the composition of penetrant given above, a straight, or 100%, "Kel-F" oil could be used, with similar results. The advantage of using an Arochlor with the "Kel-F" oil is to increase the solvent action toward the dye, while the added trichloroethylene facilitates the removal of superficial penetrant and also greatly lessens the cost of the penetrant.

EXAMPLE II

Non-fluorescent penetrant-fluorescent developer

The same penetrant was used but a dry fluorescent developer was employed having the following composition:

Parts by wt.
- Santocel _____ 100
- Fluorol 7 GA _____ 7

The dry developer was sprayed on to the test piece, after the application of the penetrant, and after removal of any non-adhering developer by an air stream, the test piece was examined under black light to ascertain the presence and extent of any surface defects.

EXAMPLE III

Fluorescent penetrant aerosol-developer-aerosol

In this example the penetrant had the following composition:

Parts by wt.
- "Kel-F" oil _____ 60.4
- Arochlor #1254 _____ 7.1
- Trichloroethylene _____ 94.7
- Fluorol 7GA _____ 0.4
- Coumarin _____ 0.3
- Freon #12 _____ 50

The "Kel-F" oil may have, incorporated therein by the supplier, a standard fluorinated inhibitor. Such fluorinated inhibitors are insensitive to liquid oxygen. The inhibited "Kel-F" oils can be used in the same proportions by weight as given in the example.

After spraying the above composition of penetrant over the surface of the test piece, the excess of penetrant was removed by spraying trichlorethane on to the surface and allowing evaporation to take place.

Thereafter, an aerosol type of developer being formulated as follows, was applied:

FORMULATION OF DEVELOPER

Parts by wt.
- Trichloroethylene _____ 276
- Albacar W–5960 _____ 23.4
- Cab-O-Sil M–5 _____ 2.3
- Freon #12 _____ 170

In the application of the developer by spraying onto the surface of the workpiece, the volatile propellant and solvent largely evaporate before the sprayed developer hits the surface so that the powder reaching the surface is substantially dry. Examination for defects is made under black light.

From the foregoing example, it will be understood that various combinations of penetrant and developer can be used. Also, as has been indicated previously, the liquid polymers of chloro-trifluoroethylene can be used by themselves as the penetrant. The use of chlorinated diphenyls with the liquid polymers, however, facilitates the keeping of the dyes (if used in the penetrant) either in solution or in a colloidal state of suspension, since the dyes are not soluble in the liquid polymers and might otherwise crystallize or precipitate out on the surface of the test piece.

It will be appreciated from the foregoing that the materials used in our method of detecting flaws are substantially inert toward liquid oxygen and therefore exhibit no tendency of reacting with liquid oxygen. This requirement eliminates from the list of materials that can be used in our method those that are fully organic in a chemical sense, such as the usual liquid hydrocarbon penetrants, and many emulsifying, coupling and other surface active type materials. The substantial non-reactivity of the components of the penetrant systems herein described has been confirmed on the ABMA Impact Sensitivity Test Instrument developed for assessing the hazard associated with products and materials contemplated for use with liquid oxygen. The use of our system comes closest to fulfilling the requirements of acceptable performance when so tested.

It will be understood that various modifications and variations of the present invention may be effected without departing from the spirit and scope of the novel concepts thereof.

We claim as our invention:

1. The method of detecting flaws in surfaces that are subsequently to be in contact with liquid oxygen, which comprises:
    applying to such surfaces an inert penetrant that is normally liquid at room temperature and that consists essentially of a polymer of chloro-trifluoroethylene that is non-flammable and relatively non-volatile, removing any excess of said penetrant to leave penetrant in any surface flaws present, and applying to such surfaces a developer in finely divided powdered form adapted to absorb any penetrant remaining in surface flaws and be wetted thereby.

2. The method defined by claim 1, wherein,
    said liquid penetrant is a polymer of chloro-trifluoroethylene having a viscosity at 100° F. of not over about 300 centistokes.

3. The method defined by claim 2, wherein,
    the excess of penetrant is removed by a volatile, non-flammable chlorinated hydrocarbon.

4. The method of detecting flaws in a surface subsequently to be in contact with liquid oxygen, which comprises:
    applying as a liquid penetrant to such surface an inert, substantially colorless, non-flammable, relatively viscous polymer of chloro-trifluoroethylene, releasing from such surface any superficially present penetrant by dissolution thereof in a volatile chlorinated hydrocarbon solvent applied to such surface,
    evaporating off said volatile chlorinated hydrocarbon solvent to leave liquid penetrant and some of said chlorinated hydrocarbon solvent in any surface flaws that may be present, and
    applying to the resulting surface a finely divided powder admixed with a color that is substantially insoluble in said polymer but soluble in said volatile hydrocarbon solvent to become wetted thereby as the penetrant exudes from any flaws therein and thereby give a color indication at such surface flaws.
5. The method defined by claim 4, wherein,
said pigment comprises finely divided silica aerogel particles as the carrier and more finely divided particles of a dye carried thereby that is soluble in the chlorinated hydrocarbon solvent used.
6. The method defined by claim 5 wherein,
subsequent to applying said finely divided pigment, the excess of the latter is removed by a gentle air stream to leave pigment only at any flaws present.
7. The method of detecting flaws in a surface subsequently to be in contact with liquid oxygen, which comprises:
spraying upon such surface a colored, normally liquid penetrant that consists essentially of a polymer of chloro-trifluoroethylene that is relatively inert to liquid oxygen, removing from such surface any excess of said penetrant while leaving penetrant in any flaws present, and
applying to the resulting surface a developer in finely divided powdered form of contrasting color to the color of said penetrant and adapted to absorb said penetrant from flaws present in said surface.
8. The method defined by claim 7 wherein,
the liquid penetrant is a polymer of chloro-trifluoroethylene having a viscosity at 100° F. of about 250 centistokes and a molecular weight of about 780.
9. The method defined by claim 8, wherein,
the penetrant is sprayed as an aerosol and removal of the excess of said penetrant is accomplished by applying to the resulting surface a volatile chlorinated hydrocarbon solvent to dissolve such excess of penetrant and evaporating of said solvent.
10. The method of detecting flaws in a surface, which comprises,
applying to said surface a liquid penetrant consisting essentially of a non-flammable, relatively non-volatile, polymer of chloro-trifluoroethylene.
11. A penetrant for detecting surface discontinuities, comprising:
a normally liquid, non-flammable and relatively non-volatile polymer of chloro-trichlorofluoroethylene,
a solvent for a dye and a coupler.
12. The penetrant defined by claim 11, wherein, the dye solvent is a chlorinated diphenyl.
13. The penetrant defined by claim 11, wherein,
the coupler is a chlorinated hydrocarbon having no flash point.
14. The penetrant defined by claim 13, wherein,
the polymer of chloro-trichlorofluoroethylene has a viscosity of between 1 and 300 centistokes at 100° F.
15. A penetrant for detecting surface discontinuities in the form of an aerosol comprising:
a penetrant consisting essentially of a normally liquid, non-flammable and relatively non-volatile, polymer of chloro-trifluoroethylene,
a chlorinated diphenyl and
a volatile chlorinated hydrocarbon having no flash point, and
a propellant that is gaseous at normal room temperature.
16. The penetrant defined by claim 15, wherein,
said penetrant is colored by a dye dispersed therein.
17. The penetrant defined by claim 16, wherein,
said dye is a fluorescent dye.
18. The penetrant defined by claim 16, wherein,
said dye is a visible, non-fluorescent dye.

References Cited
UNITED STATES PATENTS

| | | | |
|---|---|---|---|
| 2,259,400 | 10/1941 | Switzer | 252—408 |
| 2,478,951 | 8/1949 | Stokely et al. | 252—408 |
| 2,707,236 | 4/1955 | DeForest | 252—408 |
| 2,764,556 | 9/1956 | Sockman et al. | 23—253 |

MORRIS O. WOLK, *Primary Examiner.*

R. E. SERWIN, *Assistant Examiner.*

U.S. Cl. X.R.

23—253; 252—408; 250—71